United States Patent [19]
Schuppel

[11] 3,810,532
[45] May 14, 1974

[54] AUTOMOTIVE TRANSMISSION WITH CLUTCH PEDAL AND HYDRAULIC TORQUE CONVERTER

[75] Inventor: Friedrich Schuppel, Friedrichshafen, Germany

[73] Assignee: Zahnradfabrik Friedrickshafen Aktiengesellschaft, Friedrickshafen, Germany

[22] Filed: Jan. 22, 1973

[21] Appl. No.: 325,890

[30] Foreign Application Priority Data
Jan. 22, 1972 Germany............................ 2203057

[52] U.S. Cl.................... 192/.062, 74/878, 74/733, 192/3.26
[51] Int. Cl............................................. F16d 21/04
[58] Field of Search .......... 192/.062, .092, 57, 3.25, 192/3.26; 74/878, 733

[56] References Cited
UNITED STATES PATENTS
3,163,271 12/1964 Hilpert............................ 192/3.25

FOREIGN PATENTS OR APPLICATIONS
714,715 9/1954 Great Britain..................... 192/3.25

Primary Examiner—Samuel Scott
Assistant Examiner—Frank H. McKenzie, Jr.
Attorney, Agent, or Firm—Karl F. Ross; Herbert Dubno

[57] ABSTRACT

An automotive transmission with a hydraulic torque converter and a pedal-operated master clutch between that converter and a gear shifter includes an acceleration inhibitor which is activated in the disengaged position of the clutch and in a drive position of a selector lever controlling the gear shifter to prevent the driver from speeding up the engine by stepping on the gas pedal preparatorily to starting the vehicle by letting in the master clutch. The torque converter is provided with a bypass clutch which, when operated, disables the acceleration inhibitor.

6 Claims, 2 Drawing Figures

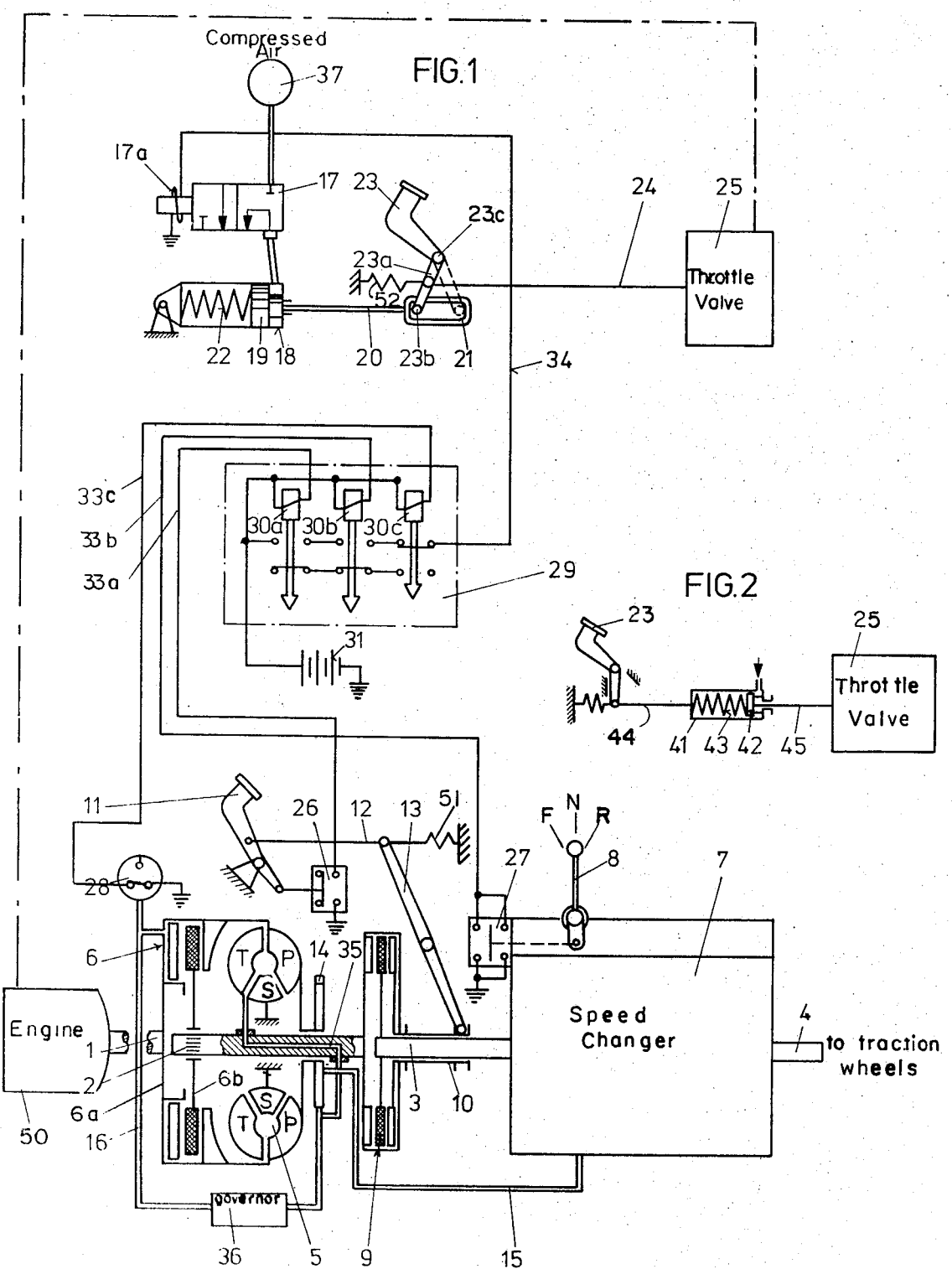

3,810,532

AUTOMOTIVE TRANSMISSION WITH CLUTCH PEDAL AND HYDRAULIC TORQUE CONVERTER

FIELD OF THE INVENTION

My present invention relates to an automotive transmission for a vehicle whose traction wheels are driven from an engine by way of a power train including a hydraulic torque converter in series with a speed changer.

BACKGROUND OF THE INVENTION

Transmission systems of this character are known, especially for use in vehicles such as trucks having a large number of "gears" or speed ratios, in which a pedal-operated or otherwise driver-controlled master clutch is interposed between the torque converter and the speed changer in order to facilitate shifting of gears, under conditions (e.g., from neutral or at the higher speed ratios) requiring a decoupling of the engine from the traction wheels.

It is also known, in such systems, to provide a bypass clutch which may be manually or automatically operated to short-circuit the torque converter, e.g., for the purpose of providing a more effective braking action by the engine, by directly connecting the engine-driven input shaft of the transmission with the turbine shaft of the converter.

In order to start such a vehicle from standstill, the correct procedure is to put the shift lever into low gear and then to step on the gas pedal to accelerate the engine, without depressing the clutch pedal. A driver unaccustomed to operating a vehicle with a torque converter may, however, choose the more familiar sequence of depressing the clutch pedal to disengage the master clutch, moving his speed selector or shift lever into gear ("drive") and thereafter slowly letting in the clutch while stepping on the gear pedal to set the traction wheels in motion. This procedure transfers the starting load from the torque converter, which is designed to absorb it, to the master clutch which may become thermally overloaded inasmuch as the engine torque is magnified by the hydraulic converter in series with the clutch.

OBJECTS OF THE INVENTION

My present invention, therefore, aims at obviating the overloading of a master or disconnect clutch in the aforedescribed manner, i.e., by improper handling of an automotive transmission of the type referred to.

A more particular object is to provide means effective in the engaged state of a bypass clutch, thus with the torque converter inoperative, to permit the establishment of a driving connection between the engine and the wheels through the co-ordinated actuation of the clutch amd gas pedals.

SUMMARY OF THE INVENTION

In accordance with the present invention I provide, in an automotive transmission system with clutch pedal and hydraulic torque converter as discussed above, an inhibitor for the driver-operated engine accelerator, i.e., for the throttle valve controlled by the gas pedal. This inhibitor is effective only under conditions conducive to the aforedescribed improper starting procedure, i.e. upon the disengagement of the master clutch with the gear selector or shift lever in a driving position (forward or reverse).

In a preferred embodiment, in which the torque converter inserted between the engine-driven input shaft and the automatic gear shifter can be made ineffectual with the aid of a bypass clutch, the acceleration inhibitor is deactivated upon the engagement of that clutch even if the master clutch is disengaged and the shift lever is in drive. Thus, a vehicle coasting in neutral under its own inertia or on a downgrade may be brought under the control of the engine with the aid of the clutch and gas pedals in the well-known manner.

BRIEF DESCRIPTION OF THE DRAWING

The above and other features of my invention will now be described in detail with reference to the accompanying drawing in which:

FIG. 1 is a diagrammatic overall view of a transmission system according to my invention; and FIG. 2 is a fragmentary diagrammatic view showing a partial modification of the system of FIG. 1.

SPECIFIC DESCRIPTION

The system shown in FIG. 1 comprises an engine 50 driving an input shaft 1 which confronts a turbine shaft of a hydraulic torque converter 5 whose pump, turbine and stator have been schematically indicated at P, T and S, respectively. Pump P is rigid with shaft 1 and with one half 6a of a hydraulic bypass clutch 6 whose other half 6b is keyed to turbine shaft 2; thus, engagement of the clutch 6 directly interconnects the shafts 1 and 2. A master clutch 9, here shown to be mechanically operable from a clutch pedal 11 by a linkage 12, 13, 10, normally couples the turbine shaft 2 with a drive shaft 3 of a gear shifter 7 whose output shaft 4 leads to the traction wheels of the vehicle. Gear shifter 7 may be of any conventional construction and is provided with a manually settable shift lever 8 controlling the selection of any of several speed ratios. For purposes of the present description, lever 8 is shown with only three operating positions, namely a neutral position N and two drive positions F (forward) and R (reverse).

Clutch pedal 11 is provided with a spring 51 tending to swing the pedal and its link member 13, shown as a lever, in a clockwise sense so as to displace member 10, shown as a sleeve on shaft 3, to the left into a clutch-engaging position. In that position a switch 26, mechanically coupled with pedal 11, is held open so as to disconnect ground from an associated lead 33a. A similar switch 27, mechanically coupled with lever 8, removes ground from a lead 33b in the neutral position N of that lever. A third switch 28 is responsive to fluid pressure in a control line 16 for clutch 6 and grounds a lead 33c only if the pressure of fluid (e.g., oil) in this line is insufficient to engage that clutch. The oil is supplied to line 16 by rotary pump 14 which is driven by the pump P of converter 5 and has its intake side connected via a suction line 15 to the sump of gear shifter 7. Pump 14 recirculates the oil to the gear shifter via a nonillustrated conduit and also feeds a line 15, shown to pass through shaft 2, maintaining the necessary fluid pressures in the torgue converter 5. A governor 36 controls the filling and draininig of line 16 to activate the clutch 6 under conditions of low engine load and/or high vehicular speed.

The fuel supply to engine 50 is controlled by a throttle valve 25 which is mechanically coupled by a link 24 with an extension 23a of a gas pedal 23 pivoted at a fulcrum 23c; a pin 23b on the free end of pedal extension 23a is connected via a rod 20 with a piston 19 in a pneumatic cylinder 18 adapted to receive air under pressure from a reservoir 37 by way of an electromagnetic valve 17. In its illustrated position, valve 17 disconnects the pressure accumulater 37 from cylinder 18 so that a spring 22 therein holds the piston 19 and its rod 20 in an extreme right-hand position in which an eye 21 at the free end of the rod enables unhindered depression of pedal 23 against the force of a biasing spring 52. Eye 21 forms with pin 23b a lost-motion coupling which inhibits the depression of pedal 23 when the piston 19 is pressed to the left by air from accumulator 37 upon a shift of valve 17 to the right by the energization of its actuating coil 17a. This coil is connected to a source of current 31, here shown as a battery, by way of a lead 34 in series with the cascaded armatures and front contacts of three relays 30a, 30b, 30c whose windings are respectively connected to leads 33a, 33b, 33c which form part of a sensing unit 29.

Relays 30a, 30b and 30c must therefore be simultaneously energized if the valve 17 is to shift into a position in which piston 19 blocks the gas pedal 23 to prevent its depression. This requires the concurrent closure of switches 26, 27 and 28 by a depression of clutch pedal 11 while lever 8 is in one of its driving positions (F or R) and fluid pressure in line 16 is so low that clutch 6 is disengaged; the latter situation has been illustrated in the drawing, with switch 28 grounding the lead 33c so that relay 30c attracts its armature onto the associated front contacts. This is the normal position on standstill from which the vehicle can be properly set in motion by moving lever 8 to "forward" drive F and stepping on the gas or accelerator pedal 23. If, instead, the driver depresses the clutch pedal 11, gas pedal 23 cannot be operated and throttle valve 25 remains in its idling position.

FIG. 2 shows an alternative arrangement in which the simple link 24 (FIG. 1) between pedal 23 and throttle valve 25 has been replaced by a linkage of variable length including two rods 44 and 45 and a pneumatic cylinder 41 whose piston 42 is integral with rod 45. A spring 43 in cylinder 41 normally keeps the linkage extended so that a depression of pedal 23 shifts piston rod 45 to the right and opens the throttle valve 25. If, however, air under pressure is admitted by way of valve 17 (FIG. 1) to cylinder 41, the cylinder is moved to the right with reference to piston 42 so that pedal 23 is swung counter-clockwise into its fully depressed position without affecting the position of rod 45. Since the pedal cannot be further depressed beyond this limit, throttle valve 25 can then no longer be opened to accelerate the engine.

The system of FIG. 2 has the advantage that the driver, feeling the gas pedal 23 receding under his foot, is automatically alerted to the necessity of releasing the clutch pedal 11 in order to regain control over the speed of the engine.

With low load/speed ratios, clutch 6 may be activated by the governor 36 to short-circuit the torque converter 5 for increased efficiency of the power train and elimination of slippage. Under these conditions, the system behaves like any standard transmission and may be handled in the same manner.

I claim:

1. An automotive transmission system for a vehicle having an engine, traction wheels and a power train between said engine and said traction wheels, comprising:

an engine-driven input shaft for said power train;
driver-operable accelerator means for the engine;
gear-shift means in said power train provided with driver-operable selector means having a neutral position and at least one driving position;
a hydraulic torque converter in said power train between said input shaft and said gear-shift means;
driver-operable clutch means between said torque converter and said gear-shift means; and
inhibitor means for said accelerator means effective upon simultaneous disengagement of said clutch means and placement of said selector means in said driving position.

2. The system as defined in claim 1, further comprising a normally disengaged bypass clutch for said torque converter engageable in response to a predetermined operating condition to connect said input shaft directly to said gear-shift means through said clutch means, said inhibitor means being effective only in the disengaged state of said bypass clutch.

3. The system as defined in claim 2, wherein said inhibitor means is provided with sensing means including three cascaded relays respectively responsive to said selector means, said clutch means and said bypass clutch.

4. The system as defined in claim 1 wherein said accelerator means includes a gas pedal, said inhibiting means comprising fluid-operable piston means for disabling said gas pedal.

5. The system as defined in claim 4 wherein said piston means is actuatable to block depression of said gas pedal.

6. The system as defined in claim 4 wherein said accelerator means includes a linkage of adjustable length coupled with said gas pedal, said piston means forming part of said linkage and being actuatable to shorten said linkage with resulting movement of said gas pedal into a fully depressed position.

* * * * *